(12) United States Patent
Moncrief (10) Patent No.: US 9,253,814 B1
(45) Date of Patent: Feb. 2, 2016

(54) WIRELESS COMMUNICATION DEVICE AND METHOD FOR INTERACTING WITH A WIRELESS HOTSPOT

(71) Applicant: Sprint Communications Company L.P., Overland Park, KS (US)

(72) Inventor: Christopher Lee Moncrief, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 89 days.

(21) Appl. No.: 14/164,684

(22) Filed: Jan. 27, 2014

(51) Int. Cl.
*H04W 4/00* (2009.01)
*H04W 76/04* (2009.01)
*H04W 88/06* (2009.01)

(52) U.S. Cl.
CPC ............ *H04W 76/045* (2013.01); *H04W 88/06* (2013.01)

(58) Field of Classification Search
CPC ............................. H04W 84/005; H04W 76/02
See application file for complete search history.

(56) References Cited

U.S. PATENT DOCUMENTS

| 7,725,115 | B2 | 5/2010 | Venkatachalam | |
|---|---|---|---|---|
| 2008/0058031 | A1* | 3/2008 | Deprun | 455/574 |
| 2010/0141400 | A1 | 6/2010 | Radulescu et al. | |
| 2011/0028085 | A1* | 2/2011 | Waung et al. | 455/7 |
| 2013/0182693 | A1* | 7/2013 | Sperling et al. | 370/338 |

\* cited by examiner

*Primary Examiner* — Shaq Taha (57) ABSTRACT

A wireless communication device (WCD) and wireless communication method are provided. The WCD in one example includes a WI-FI transceiver configured to exchange wireless communications using a WI-FI communication protocol, an alternative wireless transceiver configured to exchange wireless communications using an alternative wireless communication protocol, and a processing system coupled to the WI-FI transceiver and the alternative wireless transceiver. The processing system is configured to transmit keep-alive messages to a wireless hotspot at intervals using the alternative wireless transceiver, determine WI-FI connectivity to the wireless hotspot based on wireless hotspot responses to the keep-alive messages, and if WI-FI connectivity to the wireless hotspot is to be initiated in the WCD, then generate a WI-FI communication readiness indication in the WCD if wireless hotspot connectivity is available and exchange communications with the wireless hotspot by emulating WI-FI communications using the alternative wireless transceiver.

14 Claims, 6 Drawing Sheets

WIRELESS COMMUNICATION DEVICE AND METHOD FOR INTERACTING WITH A WIRELESS HOTSPOT

TECHNICAL BACKGROUND

Wireless communication systems can include wireless hotspots that provide localized areas of wireless Internet connectivity. Wireless hotspots can be installed in public places such as coffee shops, restaurants, businesses, public buildings, and places where they can be accessed by travelers, such as airport, train, and bus terminals, for example. A wireless hotspot can comprise a wireless router that is linked to the Internet, wherein a device can obtain Internet access through the wireless hotspot.

Wireless hotspots typically use the WI-FI communication protocol (also known as "Wi-Fi" or "WiFi," short for "Wireless Fidelity"). The WI-FI communication protocol is based on the Institute of Electrical and Electronics Engineers (IEEE) 802.11 standards. As a result, a person can connect to and use a wireless hotspot if the person has a wireless device that can communicate with the wireless hotspot using WI-FI technology.

BLUETOOTH is another wireless communication protocol that is commonly implemented in wireless hotspots. BLUETOOTH was invented by telecomm vendor Ericsson as a wireless alternative to RS-232 data cables. BLUETOOTH was standardized as IEEE 802.15.1.

However, due to the increasing popularity of wireless hotspots, and increasing utilization and traffic levels, obtaining a prompt connection can be problematic. Obtaining a prompt connection can be further complicated if the person is passing through a wireless hotspot and desires a quick connection in order to quickly and efficiently obtain information.

Many wireless hotspots can communicate using both WI-FI and BLUETOOTH, and therefore are capable of providing redundant wireless communications. Unfortunately, WI-FI and BLUETOOTH interactions are not effectively integrated in wireless hotspots in order to optimize the WI-FI experience.

Overview

A wireless communication device (WCD) and wireless communication method are provided. The WCD in one example includes a WI-FI transceiver configured to exchange wireless communications using a WI-FI communication protocol, an alternative wireless transceiver configured to exchange wireless communications using an alternative wireless communication protocol, and a processing system coupled to the WI-FI transceiver and the alternative wireless transceiver. The processing system is configured to transmit keep-alive messages to a wireless hotspot at intervals using the alternative wireless transceiver, determine WI-FI connectivity to the wireless hotspot based on wireless hotspot responses to the keep-alive messages, and if WI-FI connectivity to the wireless hotspot is to be initiated in the WCD, then generate a WI-FI communication readiness indication in the WCD if wireless hotspot connectivity is available and exchange communications with the wireless hotspot by emulating WI-FI communications using the alternative wireless transceiver.

DETAILED DESCRIPTION

Figure 1:
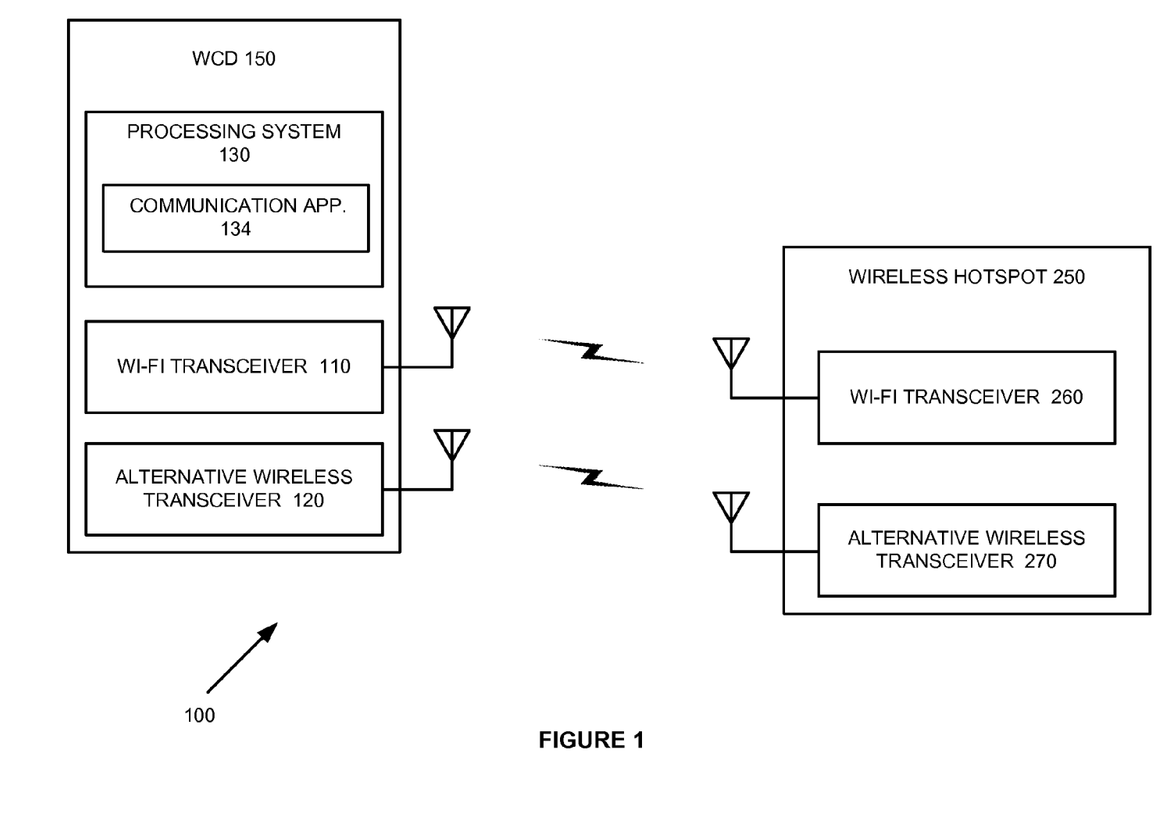
FIG. 1 shows an exemplary wireless communication system including a Wireless Communication Device (WCD) and a wireless hotspot.

FIG. 1 shows an exemplary wireless communication system 100 including a Wireless Communication Device (WCD) 150 and a wireless hotspot 250. It should be understood that the wireless communication system 100 can include other devices and systems that are not shown for clarity. The WCD 150 can connect to the wireless hotspot 250 and exchange communications with the wireless hotspot 250 if the WCD 150 is within a coverage area of the wireless hotspot 250. The WCD 150 can use a WI-FI communication protocol to exchange communications with the wireless hotspot 250 in some examples. The WI-FI communication protocol comprises a wireless communication protocol that is commonly used for wireless Internet connections. In addition, the WCD 150 can communicate with the wireless hotspot 250 using other wireless communication protocols.

The WCD 150 in some examples comprises a mobile device that can be carried by a user. The WCD 150 can comprise a wireless communication device, among other things. The WCD 150 includes a processing system 130, a WI-FI transceiver 110, and an alternative wireless transceiver 120 in some examples. The WI-FI transceiver 110 is configured to exchange WI-FI communications. The alternative wireless transceiver 120 is configured to exchange wireless communications in a communication protocol that is not a WI-FI communication protocol.

The processing system 130 is configured to execute software or programming that controls operation of the WCD 150, along with data and values needed for operation. The processing system 130 can execute at least one communication application 134. The communication application 134 can configure the WCD 150 to wirelessly communicate, including communicating wirelessly with the wireless hotspot 250. One or both of the WI-FI transceiver 110 and the alternative wireless transceiver 120 can wirelessly connect to the wireless hotspot 250. One or both of the WI-FI transceiver 110 and the alternative wireless transceiver 120 can wirelessly connect to one or more corresponding wireless communication services of the wireless hotspot 250 in order to exchange communications.

The communication application 134 can comprise any suitable wireless communication application. The communication application 134 comprises software or instructions that can be executing by the processing system 130 in order to perform a communication task or tasks. The communication application 134 can communicate with external devices using one or both of the WI-FI transceiver 110 and the alternative wireless transceiver 120. The communication application 134 can interact and communicate with the WI-FI transceiver 110 and the alternative wireless transceiver 120. The communication application 134 can request or initiate communications between the WCD 150 and the wireless hotspot 250.

The wireless hotspot 250 in some examples comprises a wireless router that offers one or more wireless communication services, with the one or more wireless communication services capable of coupling the WCD 150 to the Internet. Wireless communication devices that are in range of the wireless hotspot 250 can connect to the wireless hotspot 250 and obtain wireless Internet access through the wireless hotspot 250.

However, the wireless hotspot 250 may be configured to be a low-power hotspot. As a result, the wireless hotspot 250 may not be configured to grant continued access to the WCD unless the WCD 150 is actually exchanging communications with the wireless hotspot 250. The WCD 150 herein can initiate contact with the wireless hotspot 250 and can obtain information from the wireless hotspot 250 that enables the WCD 150 to begin WI-FI communications much more quickly and efficiently. The WCD 150 can initiate contact with the wireless hotspot 250 using the alternative wireless transceiver 120 and a corresponding alternative communication protocol. The alternative wireless transceiver 120 in some examples comprises a BLUETOOTH transceiver, but it should be understood that the alternative wireless transceiver 120 can employ any other suitable communication protocol.

The wireless hotspot 250 in some examples includes one or more wireless communication transceivers. The wireless hotspot 250 in the example shown includes a WI-FI transceiver 260 and an alternative wireless transceiver 270. The WI-FI transceiver 260 can connect a wireless communication device to the Internet via a WI-FI communication link. The alternative wireless transceiver 270 can connect a wireless communication device to the Internet via an alternative wireless communication link. The alternative wireless transceiver 270 can comprise any wireless transceiver that is not a WI-FI transceiver. The alternative wireless transceiver 270 of the wireless hotspot 250 can comprise a transceiver of the same communication protocol as the alternative wireless transceiver 120 of the WCD 150, in some examples. As a result, the WCD 150 and the wireless hotspot 250 can exchange wireless communications using the alternative wireless transceiver 120 and/or the alternative wireless transceiver 270.

In some examples, the communication application 134 when executed by the WCD 150 in general or the processing system 130 in particular operates to direct the WCD 150 or the processing system 130 to transmit keep-alive messages to the wireless hotspot 250 at intervals using the alternative wireless transceiver 120, determine WI-FI connectivity to the wireless hotspot 250 based on wireless hotspot responses to the keep-alive messages, and if WI-FI connectivity to the wireless hotspot 250 is to be initiated in the WCD 150, then generate a WI-FI communication readiness indication in the WCD 150 if wireless hotspot connectivity is available and exchange communications with the wireless hotspot 250 by emulating WI-FI communications using the alternative wireless transceiver 120.

The keep-alive messages can comprise messages that exchange identifying information with the wireless hotspot. The keep-alive messages can comprise messages that exchange communication setup information with the wireless hotspot. The keep-alive messages can comprise ping messages in some examples.

In some examples, the keep-alive messages are transmitted before wireless connectivity has been initiated by a communication application resident in the WCD. In some examples, the processing system is configured to generate the WI-FI communication readiness indication even if the WI-FI transceiver has not completed the setup of WI-FI communications with the wireless hotspot. In some examples, the processing system is configured to generate the WI-FI communication readiness indication using the alternative wireless transceiver.

In some examples, the processing system is configured to determine that WI-FI connectivity is currently available and to generate the WI-FI communication readiness indication if a wireless hotspot response is received to a most-recently transmitted keep-alive message. In some examples, the processing system is configured to determine that WI-FI connectivity is currently available and to generate the WI-FI communication readiness indication if a wireless hotspot response is received to a most-recently transmitted keep-alive message within a predetermined response time.

In some examples, the processing system is configured to exchange communications with the wireless hotspot using the alternative wireless transceiver until the WI-FI transceiver has successfully set up WI-FI communications with the wireless hotspot.

Figure 2:
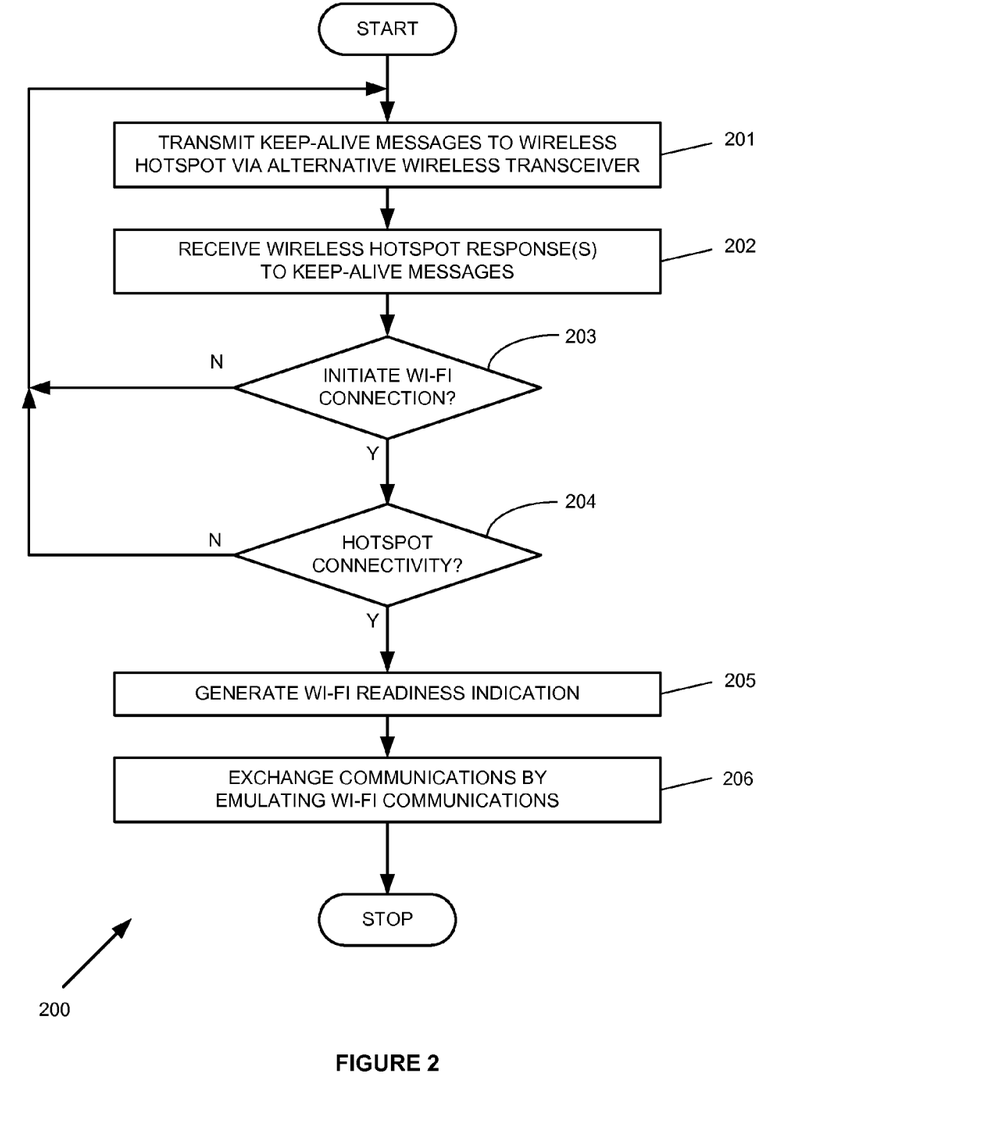
FIG. 2 shows a flowchart of an exemplary wireless communication method of interacting with a wireless hotspot.

FIG. 2 shows a flowchart 200 of an exemplary wireless communication method for interacting with a wireless hotspot. The wireless communication method can be employed by a WCD in order to connect to and exchange communications with a wireless hotspot. In step 201, the WCD transmits keep-alive messages to the wireless hotspot at intervals using an alternative wireless transceiver. The keep-alive messages can be intermittently or periodically transmitted to the wireless hotspot. In some examples, the keep-alive messages are in an alternative communication protocol of the alternative wireless transceiver.

In step 202, the WCD can receive wireless hotspot responses to the keep-alive messages. It should be understood that the WCD may or may not receive wireless hotspot responses. If the WCD is not within a coverage area of a wireless hotspot, then the WCD will not receive wireless hotspot responses. Alternatively, the WCD may not receive wireless hotspot responses where the WCD is not recognized, where access has not been granted to the WCD, where communication protocol or format differences exist, where the wireless hotspot is currently overloaded, where one or both of the WCD or the wireless hotspot are experiencing interference, or due to other circumstances.

In step 203, the WCD waits for a WI-FI connection to be initiated. This can include waiting for a user of the WCD to request or initiate WI-FI connectivity. This can include waiting for a communication application resident in the WCD to request or initiate WI-FI connectivity. If a WI-FI connection is initiated, the method proceeds on to step 204. Otherwise, the method branches back to step 201 and waits.

In step 204, if wireless hotspot connectivity is indicated, then the method proceeds to step 205. Wireless hotspot connectivity can be indicated as a result of the WCD receiving wireless hotspot responses to the keep-alive messages that are transmitted by the WCD to the wireless hotspot, using the alternative wireless transceiver in some examples. Wireless hotspot connectivity may not be indicated where wireless hotspot responses have not been received. Wireless hotspot connectivity may not be indicated where wireless hotspot responses have not been received within a predetermined response period. Otherwise, where wireless hotspot connectivity is not indicated, the method branches back to step 201 and waits.

In step 205, where a WI-FI connection has been initiated and where hotspot connectivity is currently available, the alternative wireless transceiver of the WCD generates a WI-FI readiness indication to the WCD. The WI-FI readiness indication is based on the previously transmitted keep-alive messages and the corresponding wireless hotspot responses to the keep-alive messages. The WI-FI readiness indication comprises a representation that the keep-alive messages have been used in order to determine that WI-FI connectivity can be obtained at a current time.

In step 206, the WCD exchanges communications with the wireless hotspot by emulating WI-FI communications, using the alternative wireless transceiver of the WCD. The WCD may or may not have knowledge that the communications being exchanged are being exchanged by the alternative wireless transceiver and not by the WI-FI transceiver. The communications can be exchanging by the alternative wireless transceiver until the WI-FI transceiver of the WCD has successfully set up communications with the WI-FI transceiver of the wireless hotspot.

Figure 3:
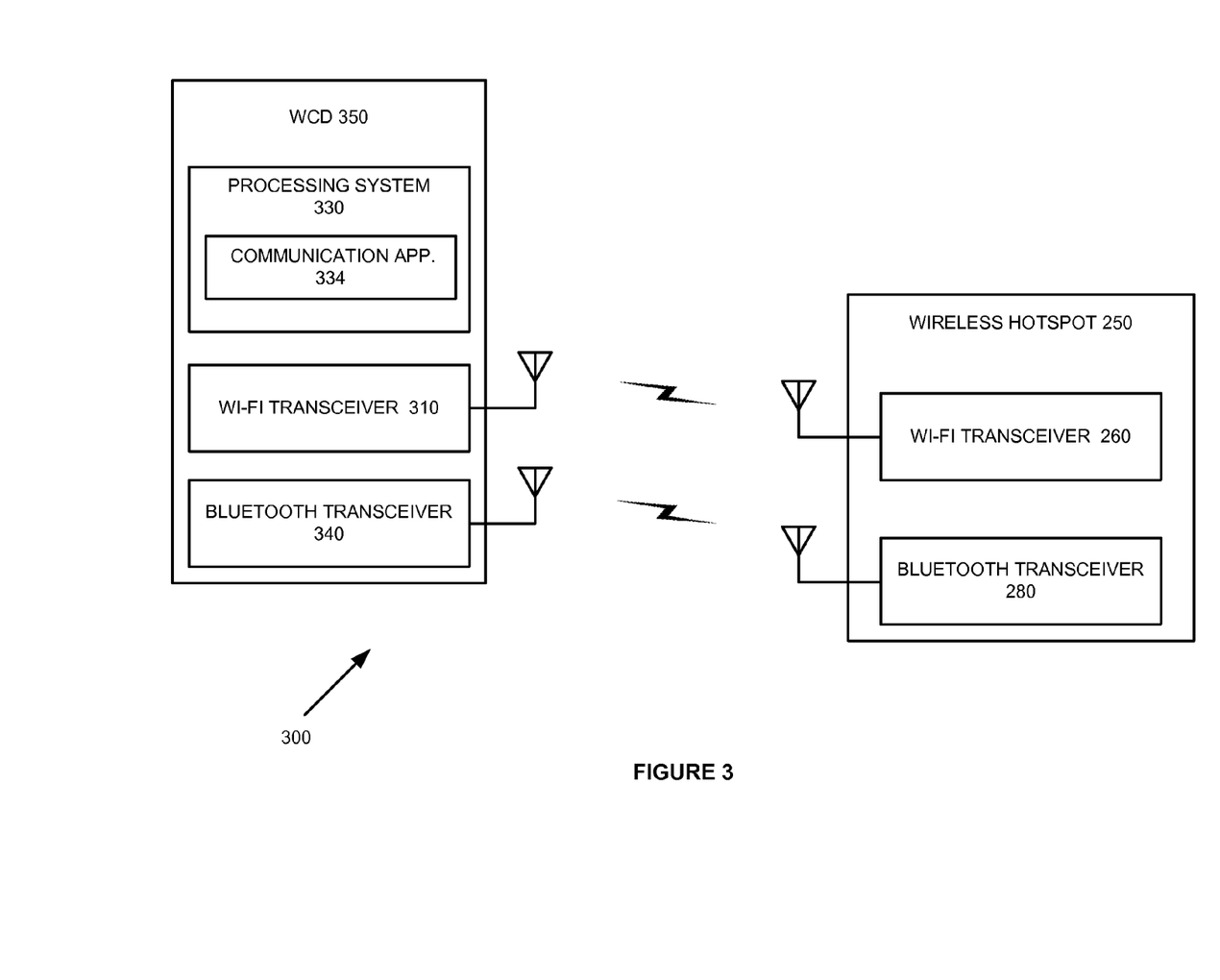
FIG. 3 shows an exemplary WCD in a wireless communication system in another example.

FIG. 3 shows an exemplary WCD 350 in a wireless communication system 300 in another example. The wireless communication system 300 in this example includes the WCD 350 and the wireless hotspot 250. The WCD 350 of FIG. 3 may be the same as or different from the WCD 150 of FIG. 1. The WCD 350 can connect to the wireless hotspot 250 and exchange communications with the wireless hotspot 250 if the WCD 350 is within a coverage area of the wireless hotspot 250, as previously discussed.

The WCD 350 in the example shown includes a processing system 330, a WI-FI transceiver 310, and a BLUETOOTH transceiver 340 in some examples. The WI-FI transceiver 310 is configured to exchange WI-FI communications. The BLUETOOTH transceiver 340 is configured to exchange wireless communications in a BLUETOOTH communication protocol. The processing system 330 can execute at least one communication application 334. The communication application 334 can configure the WCD 350 to wirelessly communicate, including communicating wirelessly with the wireless hotspot 250. One or both of the WI-FI transceiver 310 and the BLUETOOTH transceiver 340 can wirelessly connect to the wireless hotspot 250. One or both of the WI-FI transceiver 310 and the BLUETOOTH transceiver 340 can wirelessly connect to one or more corresponding wireless communication services of the wireless hotspot 250 in order to exchange communications.

The communication application 334 can communicate with external devices using one or both of the WI-FI transceiver 310 and the BLUETOOTH transceiver 340. The communication application 334 can interact and communicate with the WI-FI transceiver 310 and the BLUETOOTH transceiver 340. The communication application 334 can request or initiate communications between the WCD 350 and the wireless hotspot 250.

The wireless hotspot 250 in some examples comprises a wireless router that offers one or more wireless communication services, with the one or more wireless communication services capable of coupling the WCD 350 to the Internet. The wireless hotspot 250 in some examples includes one or more wireless communication transceivers. The wireless hotspot 250 in the example shown includes a WI-FI transceiver 260 and a BLUETOOTH transceiver 280. The WI-FI transceiver 260 can connect a wireless communication device to the Internet via a WI-FI communication link. The BLUETOOTH transceiver 280 can connect a wireless communication device to the Internet via a BLUETOOTH communication link. As a result, the WCD 350 and the wireless hotspot 250 can exchange wireless communications using the BLUETOOTH transceiver 340 and/or the BLUETOOTH transceiver 280.

In some examples, the communication application 334 when executed by the WCD 350 in general or the processing system 330 in particular operates to direct the WCD 350 or the processing system 330 to transmit keep-alive messages to the wireless hotspot 250 at intervals using the BLUETOOTH transceiver 340, determine WI-FI connectivity to the wireless hotspot 250 based on wireless hotspot responses to the keep-alive messages, and if WI-FI connectivity to the wireless hotspot 250 is to be initiated in the WCD 350, then generate a WI-FI communication readiness indication in the WCD 350 if wireless hotspot connectivity is available and exchange communications with the wireless hotspot 250 by emulating WI-FI communications using the BLUETOOTH transceiver 340.

Figure 4:
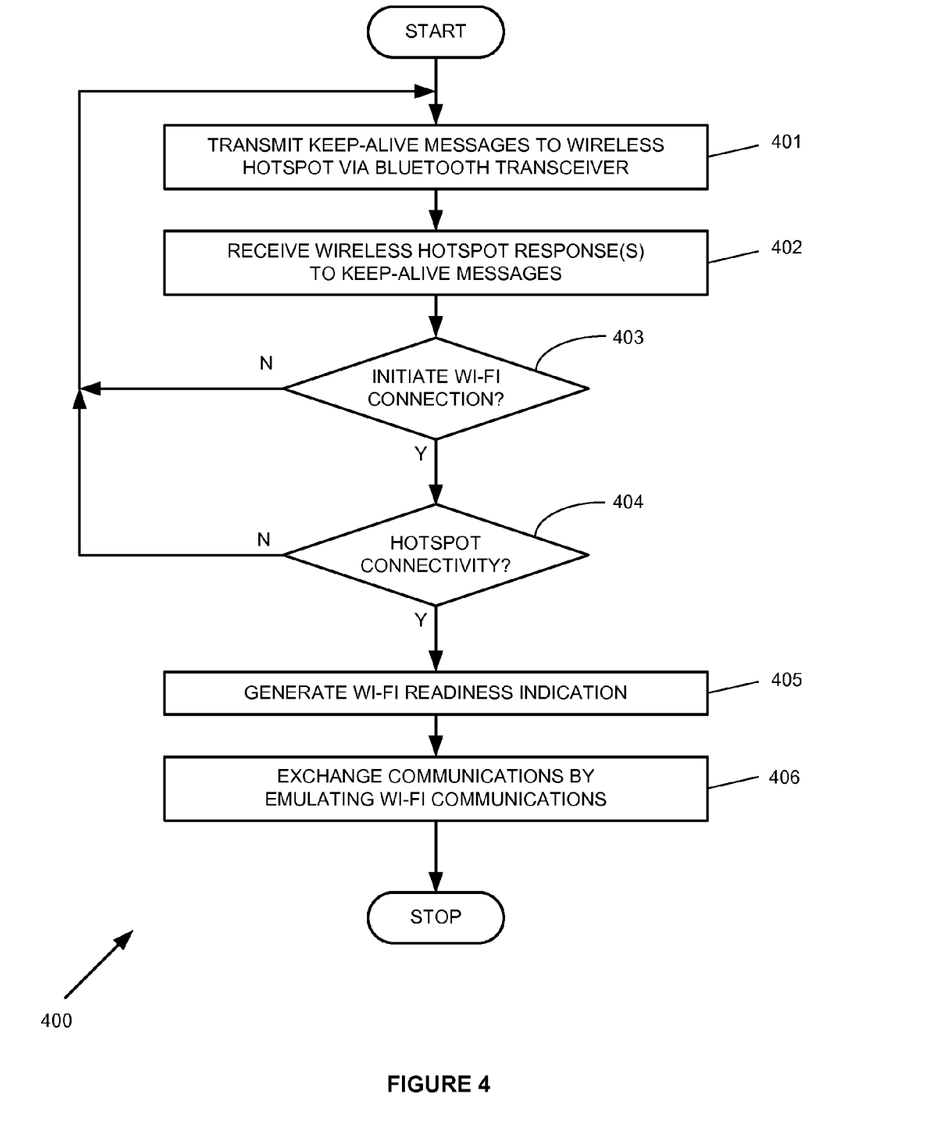
FIG. 4 shows a flowchart of another exemplary wireless communication method in another example.

FIG. 4 shows a flowchart 400 of another exemplary wireless communication method in another example. The wireless communication method can be employed by a WCD in order to connect to and exchange communications with a wireless hotspot. In step 401, the WCD transmits keep-alive messages to the wireless hotspot at intervals using an alternative wireless transceiver, as previously discussed. The keep-alive messages are in a BLUETOOTH communication protocol of the BLUETOOTH transceiver.

In step 402, the WCD can receive wireless hotspot responses to the keep-alive messages, as previously discussed.

In step 403, the WCD waits for a WI-FI connection to be initiated. This can include waiting for a user of the WCD to request or initiate WI-FI connectivity. This can include waiting for a communication application resident in the WCD to request or initiate WI-FI connectivity. If a WI-FI connection is initiated, the method proceeds on to step 404. Otherwise, the method branches back to step 401 and waits.

In step 404, if wireless hotspot connectivity is indicated, then the method proceeds to step 405. Wireless hotspot connectivity can be indicated as a result of the WCD receiving wireless hotspot responses to the keep-alive messages that are transmitted by the WCD to the wireless hotspot, using the BLUETOOTH transceiver, as previously discussed. Otherwise, where wireless hotspot connectivity is not indicated, the method branches back to step 401 and waits.

In step 405, where a WI-FI connection has been initiated and where hotspot connectivity is currently available, the BLUETOOTH transceiver of the WCD generates a WI-FI readiness indication to the WCD. The WI-FI readiness indication is based on the previously transmitted keep-alive messages and the corresponding wireless hotspot responses to the keep-alive messages. The WI-FI readiness indication comprises a representation that the keep-alive messages have determined that WI-FI connectivity can be obtained at a current time.

In step 406, the WCD exchanges communications with the wireless hotspot by emulating WI-FI communications, using the BLUETOOTH transceiver of the WCD. The WCD may or may not have knowledge that the communications being exchanged are being exchanged by the BLUETOOTH transceiver and not by the WI-FI transceiver. The communications can be exchanging by the BLUETOOTH transceiver until the WI-FI transceiver of the WCD has successfully set up communications with the WI-FI transceiver of the wireless hotspot.

Figure 5:
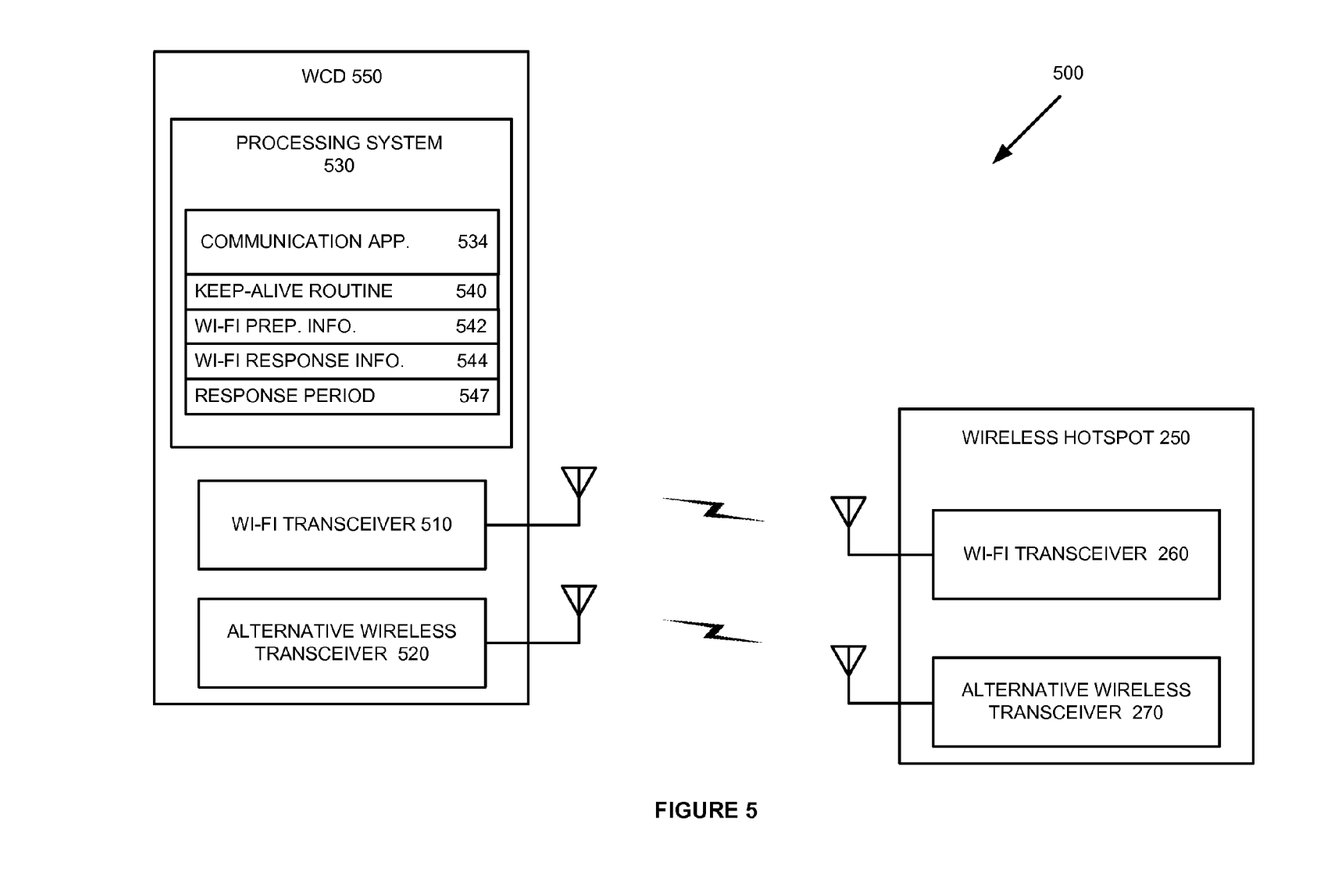
FIG. 5 shows another exemplary WCD in a wireless communication system in yet another example.

FIG. 5 shows another exemplary WCD 550 in a wireless communication system 500 in yet another example. The wireless communication system 500 includes the WCD 550 and the wireless hotspot 250. The WCD 550 of FIG. 5 is an example of the WCD 150 of FIG. 1, and the WCD 550 maybe the same as or different from the WCD 150 of FIG. 1 (or the WCD 350 of FIG. 3). The WCD 550 can connect to the wireless hotspot 250 and exchange communications with the wireless hotspot 250 if the WCD 550 is within a coverage area of the wireless hotspot 250, as previously discussed.

The WCD 550 in the example shown includes a processing system 530, a WI-FI transceiver 510, and an alternative wireless transceiver 520 in some examples. In addition, the WCD 550 includes a communication application 534, a keep-alive routine 540, WI-FI preparatory information 542, WI-FI response information 544, and a predetermined response period 547.

The WI-FI transceiver 510 is configured to exchange WI-FI communications. The alternative wireless transceiver 520 is configured to exchange wireless communications in a communication protocol that is not a WI-FI communication protocol. The processing system 530 can execute the communication application 534. The communication application 534 can configure the WCD 550 to wirelessly communicate, including communicating wirelessly with the wireless hotspot 250. One or both of the WI-FI transceiver 510 and the alternative wireless transceiver 520 can wirelessly connect to the wireless hotspot 250. One or both of the WI-FI transceiver 510 and the alternative wireless transceiver 520 can wirelessly connect to one or more corresponding wireless communication services of the wireless hotspot 250 in order to exchange communications.

The keep-alive routine 540 performs a keep-alive function, with the keep-alive routine 540 transmitting keep-alive messages at intervals to the wireless hotspot 250. The keep-alive routine 540 monitors communications with the wireless hotspot 250 and receives wireless hotspot responses, if any. The keep-alive routine 540 determines whether wireless hotspot responses have been received. The keep-alive routine 540 determines whether wireless hotspot responses have been received within a specified time period, such as the predetermined response period 547, for example. The keep-alive routine 540 determines whether WI-FI connectivity is available, based on responses or non-responses to the transmitted keep-alive messages. The keep-alive routine 540 in some examples extracts information from the wireless hotspot responses, if received.

The WI-FI preparatory information 542 comprises information that can be sent to the wireless hotspot 250 in the keep-alive messages. The WI-FI preparatory information 542 can include information prompting the wireless hotspot 250 to acknowledge the WCD 550. The WI-FI preparatory information 542 can include information prompting the wireless hotspot 250 to be aware of the presence of the WCD 550. The WI-FI preparatory information 542 can include information for exchanging identification information between the WCD 550 and the wireless hotspot 250. The WI-FI preparatory information 542 can include information for exchanging communication setup information between the WCD 45 and the wireless hotspot 250.

The WI-FI response information 544 comprises information received from the wireless hotspot 250 in response to a keep-alive message or messages. The WI-FI response information 544 can comprise information that can be used by the WCD 550 to request a WI-FI communication setup with the wireless hotspot 250. The WI-FI response information 544 can comprise information that can be used by the WCD 550 to complete a WI-FI communication setup with the wireless hotspot 250.

The predetermined response period 547 comprises a time limit for receiving a wireless hotspot response to a keep-alive message. The predetermined response period 547 can be loaded into a timer of the WCD 550 when a keep-alive message is being transmitted. If a wireless hotspot response is received before the predetermined response period expires, then the WCD 550 can determine that connectivity is currently available to the wireless hotspot 250. Otherwise, if a wireless hotspot response has not been received before the predetermined response period expires, then the WCD 550 determines that connectivity to the wireless hotspot 250 is not currently available.

It should be understood that the keep-alive process is iteratively performed by the WCD 550. As a result, the connectivity determination comprises only a current connectivity state or condition. The connectivity state or condition can change after transmission of each keep-alive message.

The communication application 534 can communicate with external devices using one or both of the WI-FI transceiver 510 and the alternative wireless transceiver 520. The communication application 534 can interact and communicate with the WI-FI transceiver 510 and the alternative wireless transceiver 520. The communication application 534 can request or initiate communications between the WCD 550 and the wireless hotspot 250.

The wireless hotspot 250 in the example shown includes a WI-FI transceiver 260 and an alternative wireless transceiver 270, as previously discussed. The WI-FI transceiver 260 can connect a wireless communication device to the Internet via a WI-FI communication link. The alternative wireless transceiver 270 can connect a wireless communication device to the Internet via an alternative wireless communication link. The alternative wireless transceiver 270 can comprise any wireless transceiver that is not a WI-FI transceiver. The alternative wireless transceiver 270 of the wireless hotspot 250 can comprise a transceiver of the same communication protocol as the alternative wireless transceiver 520 of the WCD 550, in some examples. As a result, the WCD 550 and the wireless hotspot 250 can exchange wireless communications using the alternative wireless transceiver 520 and/or the alternative wireless transceiver 270.

In some examples, the communication application 534 when executed by the WCD 550 in general or the processing system 530 in particular operates to direct the WCD 550 or the processing system 530 to transmit keep-alive messages to the wireless hotspot 250 at intervals using the alternative wireless transceiver 520, with the keep-alive messages including WI-FI preparatory information 542, determine WI-FI connectivity to the wireless hotspot 250 based on wireless hotspot responses to the keep-alive messages, with the wireless hotspot responses including WI-FI response information 544, and if WI-FI connectivity to the wireless hotspot 250 is to be initiated in the WCD 550, then generate a WI-FI communication readiness indication in the WCD 550 if wireless hotspot connectivity is available and exchange communications with the wireless hotspot 250 by emulating WI-FI communications using the alternative wireless transceiver 520 and the WI-FI response information 544.

Figure 6:
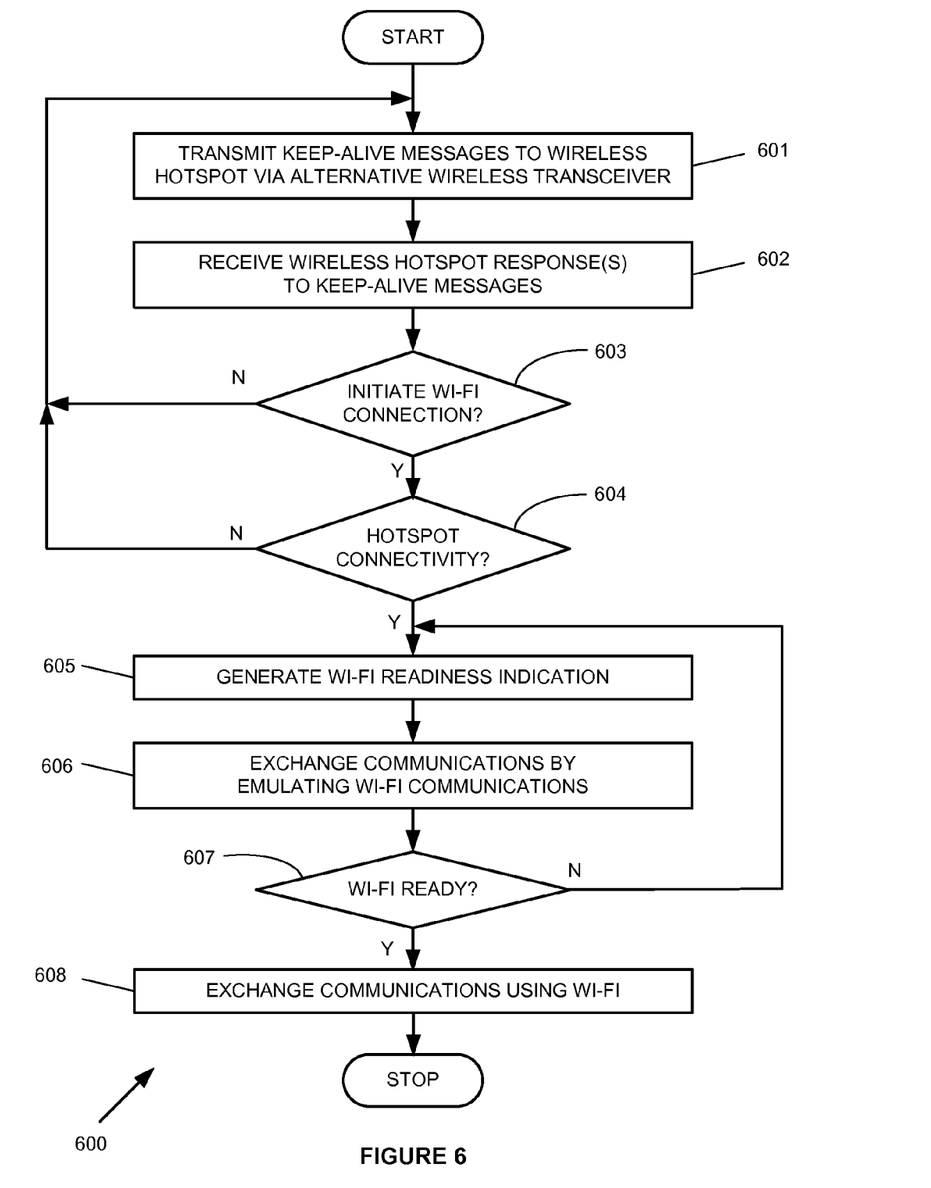
FIG. 6 shows a flowchart of another exemplary wireless communication method in yet another example.

FIG. 6 shows a flowchart 600 of another exemplary wireless communication method in yet another example. The wireless communication method can be employed by a WCD in order to connect to and exchange communications with a wireless hotspot. In step 601, the WCD transmits keep-alive messages to the wireless hotspot via an alternative wireless transceiver, as previously discussed. In some examples, the keep-alive messages are in an alternative communication protocol of the alternative wireless transceiver.

In step 602, the WCD can receive wireless hotspot responses to the keep-alive messages, as previously discussed. The WCD may or may not receive wireless hotspot responses.

In step 603, the WCD waits for a WI-FI connection to be initiated. This can include waiting for a user of the WCD to request or initiate WI-FI connectivity. This can include waiting for a communication application resident in the WCD to request or initiate WI-FI connectivity. If a WI-FI connection is initiated, the method proceeds on to step 604. Otherwise, the method branches back to step 601 and waits.

In step 604, if wireless hotspot connectivity is indicated, then the method proceeds to step 605. Wireless hotspot connectivity can be indicated as a result of the WCD receiving wireless hotspot responses to the keep-alive messages that are transmitted by the WCD to the wireless hotspot, using the alternative wireless transceiver, as previously discussed. Otherwise, where wireless hotspot connectivity is not indicated, the method branches back to step 601 and waits.

In step 605, where a WI-FI connection has been initiated and where hotspot connectivity is currently available, the alternative wireless transceiver of the WCD generates a WI-FI readiness indication to the WCD. The WI-FI readiness indication is based on the previously transmitted keep-alive messages and the corresponding wireless hotspot responses to the keep-alive messages. The WI-FI readiness indication comprises a representation that the keep-alive messages have determined that WI-FI connectivity can be obtained at a current time.

In step 606, the WCD exchanges communications with the wireless hotspot by emulating WI-FI communications, using the alternative wireless transceiver of the WCD. The WCD may or may not have knowledge that the communications being exchanged are being exchanged by the alternative wireless transceiver and not by the WI-FI transceiver. The communications can be exchanging by the alternative wireless transceiver until the WI-FI transceiver of the WCD has successfully set up communications with the WI-FI transceiver of the wireless hotspot.

In step 607, if the WI-FI setup is complete and WI-FI communications are ready, the method proceeds to step 608. Otherwise, where WI-FI communications are not ready, the method branches back to step 605 and waits for WI-FI communications to be set up (and continues to use the alternative wireless transceiver to participate in the WI-FI setup and/or to exchange communications with the wireless hotspot).

In step 608, where the WI-FI setup is complete, the WCD begins exchanging communications with the wireless hotspot using the WI-FI transceiver of the WCD and using WI-FI protocol communications.

Referring again to FIG. 1, the wireless communication system in the examples can provide communication services including voice calls, text messages, data access, or other communication services provided over cellular or wireless communication networks. In some examples, the wireless communication system includes equipment to provide wireless access to communication services to user devices within different coverage areas, route communications between content providers and user devices, and facilitate handoffs between equipment of different coverage areas, among other operations.

The wireless communication system can include one or more wireless hotspots. The wireless hotspots may be coupled together by communication links. The wireless hotspots may be further coupled to other devices or networks, including telephone landlines or Internet links, for example. As a result, communications exchanged between the WCD and the wireless hotspot may be further provided to other devices within the wireless communication system.

The wireless hotspot in the examples includes processing equipment, routing equipment, physical structures, and can also include transceiver equipment, antenna equipment, and other equipment. The wireless hotspot includes at least one transceiver and antenna for exchanging wireless communications with WCDs. It should be understood that the wireless hotspot could be distributed or consolidated among equipment or circuitry that together forms the elements of the wireless hotspot. Further equipment, networks, and systems can be communicatively coupled to the wireless hotspot, such as equipment, networks, and systems of cellular voice and data communication systems, but are omitted from the figures for clarity.

The wireless hotspot in the examples is capable of communicating with WCDs and may communicate using a variety of frequencies and a variety of communication schemes. A wireless hotspot can provide one or more wireless links in some embodiments. A wireless hotspot can provide a cell or sector of wireless coverage in some embodiments. Any number of wireless hotspots can be included in the wireless communication system.

The WCD can comprise a mobile device, including a cellular phone, but also may include other devices. The WCD can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The WCD may be integrated within other systems and devices, such as vehicles, appliances, apparel, and the like. The WCD can detect and report various system conditions to the wireless access node, such as inter-cell interference and failed signaling access.

The WCDs in the examples can receive wireless access to communication services through the wireless hotspot. The communication services can include data transfers, voice calls, text messaging, data exchange, multimedia streaming, and the like. The WCD can include transceivers for communicating over wireless links of differing frequency bands.

The communication interface in the examples comprises a network card, network interface, port, or interface circuitry that allows the wireless access node to communicate with other communication devices over a variety of networks. The communication interface may also include a memory device, software, processing circuitry, or some other device. The communication interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The communication interface in the examples comprises an interface for communicating with wireless hotspots, with other WCDs, and with other wireless communication devices. The communication interface receives command and control information and instructions from the processing system for controlling the operations of the communication interface and the WCD over wireless links, coordinating handoffs of the WCD between wireless access systems, and exchanging authentication or authorization information with other wireless access networks. The wireless link can use various protocols or communication formats as described herein, including combinations, variations, or improvements thereof.

Referring to FIG. 1, 3, or 5, the processing system in the examples can comprise one or more microprocessors and other circuitry that retrieves and executes the keep-alive routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the keep-alive routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the keep-alive routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the keep-alive routine can, when loaded into the processing system and executed, transform the processing system into a special-purpose computing system configured to interact with a wireless hotspot, among other operations. Encoding the keep-alive routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the keep-alive routine can transform the physical state of the semiconductor memory when the program is encoded therein. For example, the keep-alive routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The keep-alive routine in the examples comprises computer programs, firmware, or some other form of machine-readable processing instructions. The keep-alive routine may include an operating system, utilities, drivers, network interfaces, applications, virtual machines, or some other type of software. The keep-alive routine can include additional processes, programs, or components, such as operating system software, database software, or application software. The keep-alive routine can also comprise firmware or some other form of machine-readable processing instructions executable by the processing system.

The keep-alive routine in the examples can include additional processes, programs, or components, such as operating system software, database software, or application software. The keep-alive routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless communication device (WCD), comprising:
a WI-FI transceiver configured to exchange wireless communications using a WI-FI communication protocol;
an alternative wireless transceiver configured to exchange wireless communications using a BLUETOOTH communication protocol; and
a processing system coupled to the WI-FI transceiver and the alternative wireless transceiver, with the processing system configured to:
transmit keep-alive messages to a wireless hotspot at intervals using the alternative wireless transceiver;
determine WI-FI connectivity to the wireless hotspot based on wireless hotspot responses to the keep-alive messages, and when WI-FI connectivity to the wireless hotspot is to be initiated in the WCD, then generate a WI-FI communication readiness indication in the WCD when a wireless hotspot response is received to a most-recently transmitted keep-alive message;
generate the WI-FI communication readiness indication even when the WI-FI transceiver has not completed the setup of WI-FI communications with the wireless hotspot and exchange communications with the wireless hotspot by emulating WI-FI communications using the alternative wireless transceiver.

2. The WCD of claim 1, wherein the processing system further configured to generate the WI-FI communication readiness indication using the alternative wireless transceiver.

3. The WCD of claim 1, wherein the processing system further configured to determine that WI-FI connectivity is currently available and to generate the WI-FI communication readiness indication when the wireless hotspot response is received to the most-recently transmitted keep-alive message within a predetermined response time.

4. The WCD of claim 1, wherein the processing system further configured to exchange communications with the wireless hotspot using the alternative wireless transceiver until the WI-FI transceiver has successfully set up WI-FI communications with the wireless hotspot.

5. The WCD of claim 1, wherein the keep-alive messages being transmitted before wireless connectivity has been initiated by a communication application resident in the WCD.

6. A wireless communication device (WCD), comprising:
a WI-FI transceiver configured to exchange wireless communications using a WI-FI communication protocol;
a BLUETOOTH transceiver configured to exchange wireless communications using a BLUETOOTH communication protocol; and
a processing system coupled to the WI-FI transceiver and the BLUETOOTH transceiver, with the processing system configured to:
transmit keep-alive messages to a wireless hotspot at intervals using the BLUETOOTH transceiver;
determine WI-FI connectivity to the wireless hotspot based on wireless hotspot responses to the keep-alive messages, and if WI-FI connectivity to the wireless hotspot is to be initiated in the WCD, then generate a WI-FI communication readiness indication in the WCD when a wireless hotspot response is received to a most-recently transmitted keep-alive message;
generate the WI-FI communication readiness indication using the BLUETOOTH transceiver even when the WI-FI transceiver has not completed the setup of WI-FI communications with the wireless hotspot and exchange communications with the wireless hotspot by emulating WI-FI communications using the BLUETOOTH transceiver.

7. The WCD of claim 6, with the keep-alive messages being transmitted before wireless connectivity has been initiated by a communication application resident in the WCD.

8. The WCD of claim 6, with the processing system further configured to determine that WI-FI connectivity is currently available and to generate the WI-FI communication readiness indication when the wireless hotspot response is received to the most-recently transmitted keep-alive message within a predetermined response time.

9. The WCD of claim 6, with the processing system further configured to exchange communications with the wireless hotspot using the BLUETOOTH transceiver until the WI-FI transceiver has successfully set up WI-FI communications with the wireless hotspot.

10. A wireless communication method, comprising:
in a wireless communication device (WCD), transmitting keep-alive messages to a wireless hotspot at intervals using an alternative wireless transceiver;
in the WCD, determining wireless hotspot connectivity based on wireless hotspot responses to the keep-alive messages; and
in the WCD, if WI-FI connectivity to the wireless hotspot is to be initiated in the WCD, then generating a WI-FI communication readiness indication in the WCD when a wireless hotspot response is received to a most-recently transmitted keep-alive message;
in the WCD, generating the WI-FI communication readiness indication even when the WI-FI transceiver has not completed the setup of WI-FI communications with the wireless hotspot and exchanging communications with the wireless hotspot by emulating WI-FI communications using the alternative wireless transceiver.

11. The wireless communication method of claim 10, with the processing system further configured to generate the WI-FI communication readiness indication using the alternative wireless transceiver.

12. The wireless communication method of claim 10, with the processing system being further configured to determine that WI-FI connectivity is currently available and to generate the WI-FI communication readiness indication when the wireless hotspot response is received to the most-recently transmitted keep-alive message within a predetermined response time.

13. The wireless communication method of claim 10, with the processing system further configured to exchange communications with the wireless hotspot using the alternative wireless transceiver until the WI-FI transceiver has successfully set up WI-FI communications with the wireless hotspot.

14. The wireless communication method of claim 10, with the keep-alive messages being transmitted before wireless connectivity has been initiated by a communication application resident in the WCD.

* * * * *